United States Patent
Kisaichi (10) Patent No.: US 12,146,542 B2
(45) Date of Patent: Nov. 19, 2024

(54) TORQUE LIMITER

(71) Applicant: Honda Motor Co., Ltd., Tokyo (JP)

(72) Inventor: Toru Kisaichi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/124,175

(22) Filed: Mar. 21, 2023

(65) Prior Publication Data

US 2023/0313843 A1 Oct. 5, 2023

(30) Foreign Application Priority Data

Mar. 30, 2022 (JP) ................ 2022-055129

(51) Int. Cl.
*F16D 7/02* (2006.01)
*F02N 11/08* (2006.01)

(52) U.S. Cl.
CPC .......... *F16D 7/027* (2013.01); *F02N 11/0851* (2013.01)

(58) Field of Classification Search
CPC .......... F16D 7/024; F16D 7/025; F16D 7/027; F02N 15/025
See application file for complete search history.

(56) References Cited

U.S. PATENT DOCUMENTS

| | | | | |
|---|---|---|---|---|
| 1,415,080 | A * | 5/1922 | Woolson | F02N 15/025 290/48 |
| 2,203,338 | A * | 6/1940 | Odell | F02N 15/025 74/9 |
| 2003/0032519 | A1* | 2/2003 | Lovatt | F16D 43/216 475/204 |
| 2014/0245984 | A1* | 9/2014 | Seillier | F02N 15/025 123/185.1 |
| 2017/0198674 | A1 | 7/2017 | Nishida | |

FOREIGN PATENT DOCUMENTS

JP 2017-125432 A 7/2017

\* cited by examiner

*Primary Examiner* — Jake Cook
(74) *Attorney, Agent, or Firm* — Birch, Stewart, Kolasch & Birch, LLP (57) ABSTRACT

A torque limiter that enables setting a larger torque capacity although being compact and easy to incorporate into a power transmission mechanism, is provided. A torque limiter is incorporated into a power transmission mechanism for transmitting power from a starter motor to a crankshaft of an internal combustion engine. The torque limiter includes a driven gear for receiving power from the starter motor and a transmission gear for transmitting power. The driven gear and the transmission gear are coaxially disposed in a relatively rotatable manner. The driven gear and the transmission gear are configured to transmit power therebetween via a friction member. The friction member has a circular disc shape with an outer diameter that is larger than an outer diameter of the driven gear.

6 Claims, 6 Drawing Sheets

TORQUE LIMITER

BACKGROUND

1. Technical Field

The present invention relates to a torque limiter that is incorporated into a power transmission mechanism for transmitting power from a starter motor.

2. Description of the Background

Some motorcycles have a starter motor for starting an internal combustion engine.

Power from a starter motor is transmitted to a crankshaft of an internal combustion engine via a power transmission mechanism, whereby the crankshaft is rotated to start the internal combustion engine.

At the start of the internal combustion engine, as the crankshaft is rotated by driving the starter motor, a piston reciprocates and then rises to compress gas in a cylinder, which may cause the starter motor to be applied with an excessive load.

In view of this, there are some examples of incorporating a torque limiter into a power transmission mechanism in order to prevent a starter motor from being applied with an excessive load (for example, Patent literature 1).

A torque limiter is a mechanism for reducing transmission of power upon receiving an excessive load.

CITATION LIST

Patent Literature

Patent literature 1: Japanese Unexamined Patent Application Publication No. 2017-125432

A power transmission mechanism, which transmits power from a starter motor to a crankshaft in an internal combustion engine mounted on a motorcycle, is disposed in a limited narrow space, and accordingly, a torque limiter to be incorporated into the power transmission mechanism is also required to be small in size and be compact.

The torque limiter that is disclosed in Patent literature 1 has a compact structure in which a driven gear for receiving power from a starter motor is axially supported in a relatively rotatable manner by a rotation shaft part of a transmission gear for transmitting power, while the transmission gear is held from both sides by friction plates.

BRIEF SUMMARY

The transmission gear has an outer diameter that is limited in the power transmission mechanism, and the friction plates that hold the transmission gear therebetween have outer diameters further smaller than that of the transmission gear and thereby have small friction areas. Thus, there is a limitation in torque capacity of the torque limiter, and it is difficult to set a large torque capacity.

A multiple-disc torque limiter in which the number of friction plates is increased to three or more, can have a greater torque capacity, but this torque limiter has an increased width in an axial direction due to lateral overlap of the plurality of friction plates and is thereby difficult to incorporate into a power transmission mechanism.

In another case, a press-in type torque limiter has a compact structure in which a driven gear is press-fitted into a rotation shaft part of a transmission gear. Unfortunately, this torque limiter requires a press-fit interference and a Corbett process (low-temperature sulfurization process) for preventing galling, causing unstable torque capacity. Thus, a setting range of torque capacity is wide, and this torque limiter is difficult to handle.

The present invention has been achieved in view of these circumstances, and an object of the present invention is to provide a torque limiter that enables setting a larger torque capacity although being compact and easy to incorporate into a power transmission mechanism.

In order to achieve the above object, the present invention provides a torque limiter that is incorporated into a power transmission mechanism for transmitting power from a starter motor to a crankshaft of an internal combustion engine. The torque limiter includes a driven gear for receiving power from the starter motor and a transmission gear for transmitting power. The driven gear and the transmission gear are coaxially disposed in a relatively rotatable manner. The driven gear and the transmission gear are configured to transmit power therebetween via a friction member. The friction member has a circular disc shape with an outer diameter that is larger than an outer diameter of the driven gear.

This structure is simple and compact such that the driven gear for receiving power and the transmission gear for transmitting power are coaxially disposed in a relatively rotatable manner and are configured to transmit power therebetween via the friction member. Thus, the torque limiter is easily incorporated into the power transmission mechanism for transmitting power from the starter motor to the crankshaft of the internal combustion engine.

Although the structure is compact, the friction member, which is interposed between the driven gear and the transmission gear to transmit power, has a circular disc shape with an outer diameter larger than that of the driven gear, whereby a large friction area is obtained, and it is easy to set a larger torque capacity to the torque limiter.

In one preferred embodiment of the present invention, the transmission gear may be integrated with a rotation shaft part into one body, the driven gear may be axially supported by the rotation shaft part in a rotatable manner, the friction member may be axially movably fitted to the rotation shaft part in a relatively non-rotatable manner, and the friction member may be biased in an axial direction toward the driven gear by a biasing member.

In this structure, the friction member, which is axially movably fitted to the rotation shaft part in a relatively non-rotatable manner, is biased by the biasing member, toward the driven gear, which is axially supported in a rotatable manner by the rotation shaft part that is integrated with the transmission gear into one body. Thus, this structure can be a simple and compact structure that enables setting a larger torque capacity.

In one preferred embodiment of the present invention, the friction member and the driven gear may hold a plate member therebetween.

In this structure, the plate member is held between the friction member and the driven gear, and therefore, the friction member and the driven gear hold the plate member therebetween without being affected by the shape and the dimensions of the driven gear. Thus, a large friction area is easily obtained, and a larger torque capacity can be set.

In one preferred embodiment of the present invention, the plate member may have a circular disc shape with an outer diameter that is larger than the outer diameter of the driven gear.

In this structure, the plate member has a circular disc shape with an outer diameter larger than that of the driven gear. This structure provides a larger friction area due to pressure-contact between the plate member and the friction member, whereby it is easy to set a large torque capacity to the torque limiter.

In one preferred embodiment of the present invention, the plate member may be engaged with the driven gear in a relatively non-rotatable manner.

In this structure, the plate member engages with the driven gear in a relatively non-rotatable manner and thereby rotates together with the driven gear without sliding. This structure enables power that is received by the driven gear, to be transmitted to the plate member without sliding, whereby a larger torque capacity is easily set.

In the present invention, the structure is simple and compact such that the driven gear for receiving power and the transmission gear for transmitting power are coaxially disposed in a relatively rotatable manner and are configured to transmit power therebetween via the friction member. Thus, the torque limiter can be incorporated into the power transmission mechanism for transmitting power from the starter motor to the crankshaft of the internal combustion engine.

Although the structure is compact, the friction member, which is interposed between the driven gear and the transmission gear to transmit power, has a circular disc shape with an outer diameter larger than that of the driven gear, whereby it is possible to increase the friction area and to easily set a larger torque capacity to the torque limiter.

DETAILED DESCRIPTION

Hereinafter, an embodiment according to the present invention will be described on the basis of FIGS. 1 to 5.

An internal combustion engine 10 according to this embodiment integrally has a transmission (not shown) on a rear side thereof and is configured to be transversely mounted on a motorcycle, in the state in which a crankshaft 20 is directed in a vehicle-width direction or a right-left direction.

Figure 1:
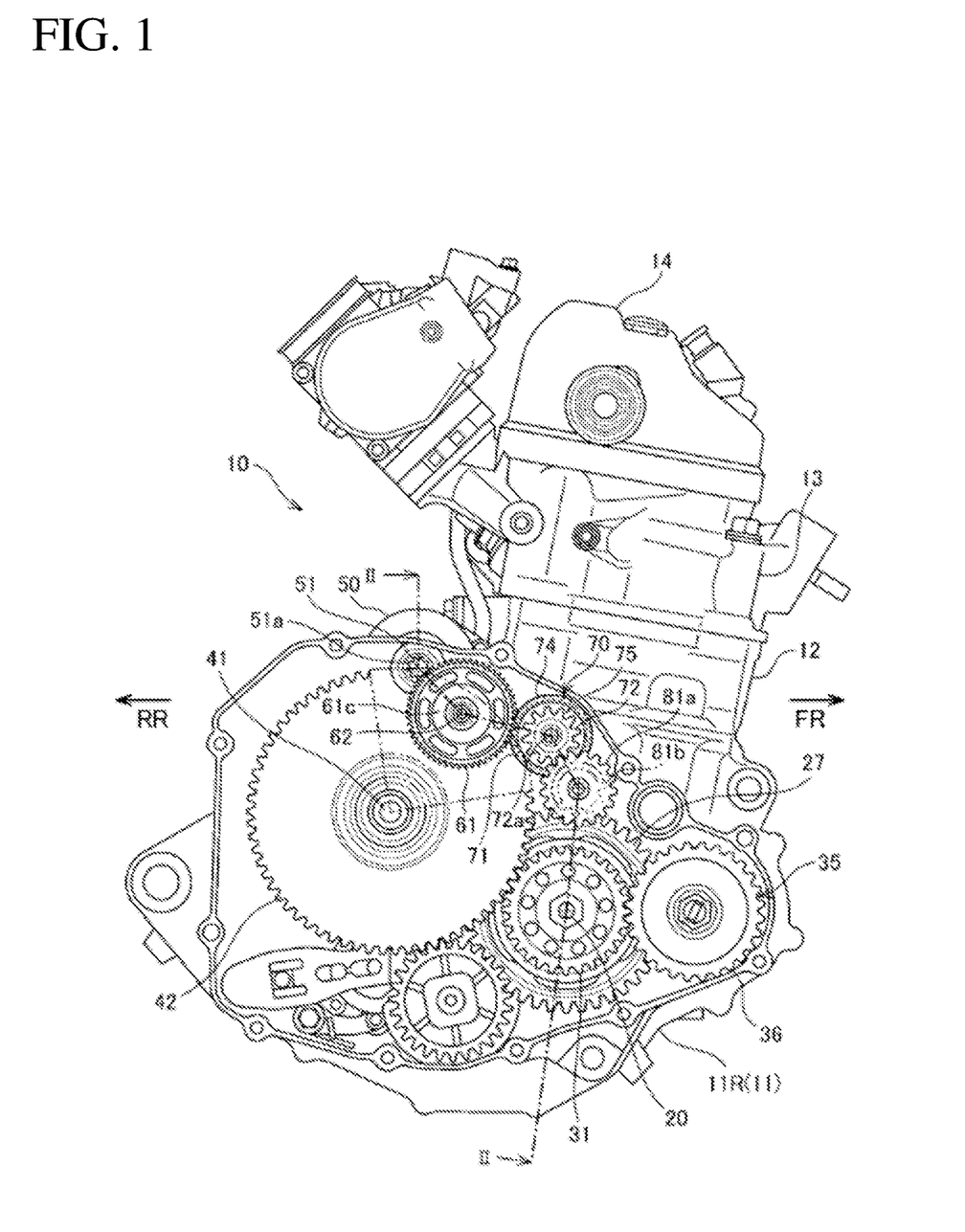
FIG. 1 is a partially omitted right side view showing an internal combustion engine according to one embodiment of the present invention, from which a right case cover is removed.
Figure 2:
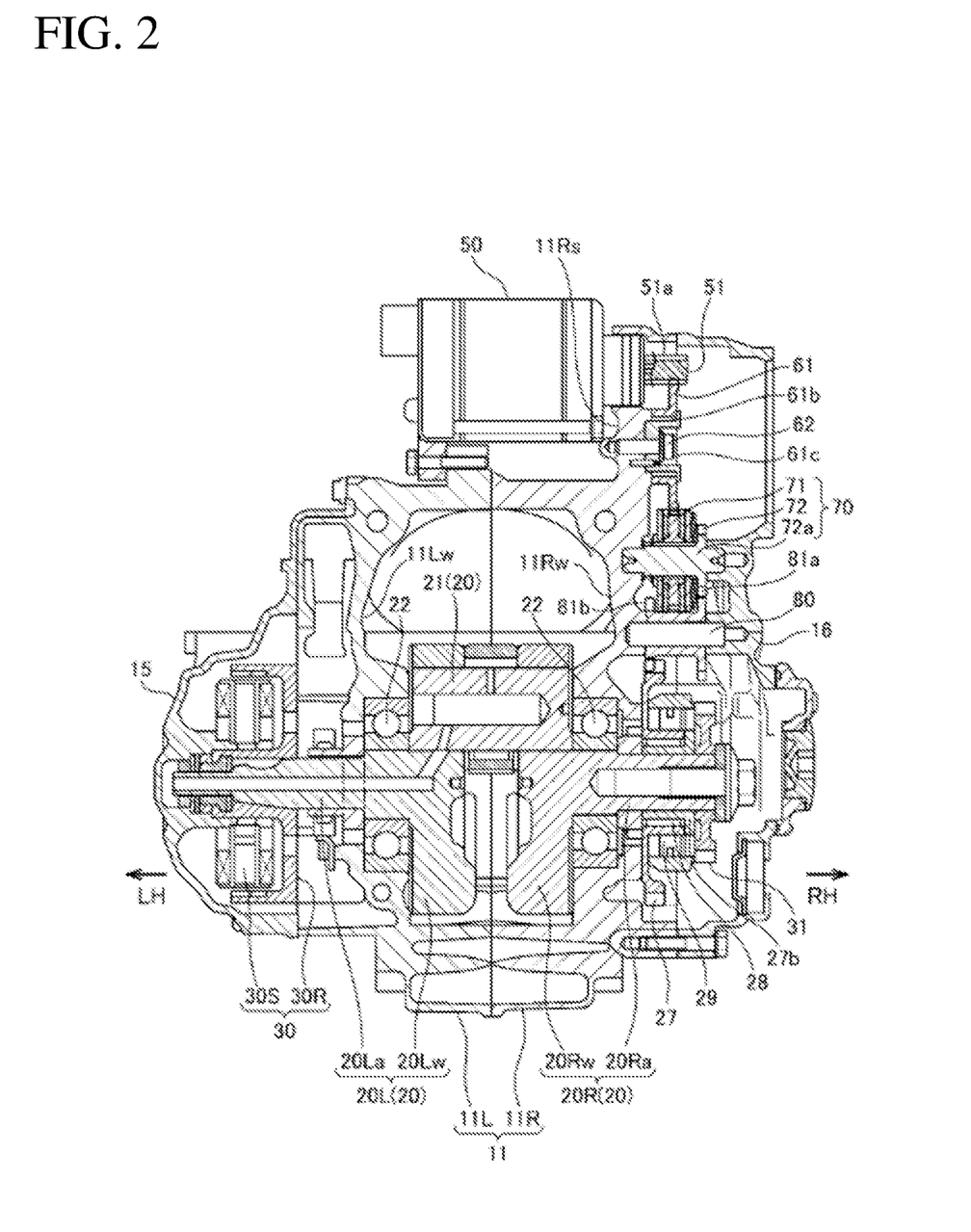
FIG. 2 is a sectional view of the internal combustion engine as seen from an arrow II-II in FIG. 1.

FIG. 1 is a partially omitted right side view showing the internal combustion engine 10, from which a right case cover 16 is removed. FIG. 2 is a sectional view of the internal combustion engine 10 as seen from an arrow II-II in FIG. 1.

Note that, in the description of this specification, the front-rear and the right-left directions follow the normal standard in which an advancing direction of a motorcycle is defined as a front direction, and in the drawings, the reference signs "FR," "RR," "LH," and "RH" denote a front direction, a rear direction, a left-hand direction, and a right-hand direction, respectively.

The internal combustion engine 10 is a single-cylinder four-stroke internal combustion engine.

A crankcase 11 axially supports the crankshaft 20 and is formed with a transmission chamber (not shown) that houses the transmission, behind a crank chamber 11C in which the crankshaft 20 is disposed.

With reference to FIG. 1, a cylinder 12 and a cylinder head 13 are stacked and are integrally fastened above the crank chamber 11C of the crankcase 11, and a cylinder head cover 14 covers the top of the cylinder head 13.

The crankcase 11 is joined to a lower part of the cylinder 12, and it is divided into right and left parts and is composed of a left crankcase 11L and a right crankcase 11R that are fitted at respective mating surfaces.

The crank chamber 11C, which is formed of the right and left crankcases 11R and 11L that are fitted together, axially supports the crankshaft 20 in a rotatable manner so that the crankshaft 20 will be directed in the right-left direction. The crankshaft 20 is composed of a combination of right and left crankshaft half bodies 20R and 20L that are coupled to each other by a crank pin 21. The crankshaft half bodies 20R and 20L respectively include right and left crankshaft bodies 20Ra and 20La, which are coaxially formed, and right and left crank webs 20Rw and 20Lw, which face each other. The mutually facing right and left crank webs 20Rw and 20Lw are coupled to each other by the crank pin 21 that is off-centered from a crankshaft center line (refer to FIG. 2).

With reference to FIG. 2, the right and left crankcases 11R and 11L have mutually facing shaft-bearing walls 11Rw and 11Lw that have bearing holes in which bearings 22 and 22 are embedded, and the right and left crankshaft bodies 20Ra and 20La of the crankshaft 20 are axially supported via the bearings 22 and 22 in a rotatable manner.

The left crankshaft body 20La of the crankshaft 20, which protrudes to the left side from the left shaft-bearing wall 11Lw, is fitted with a drive chain sprocket 25 and is also fitted with an outer rotor 30R of an AC generator 30 at a left end part. The AC generator 30 has an inner stator 30S that is supported by a left case cover 15.

On the other hand, the right crankshaft body 20Ra of the crankshaft 20, which protrudes to the right side from the right shaft-bearing wall 11Rw, is fitted with a gear boss 27b. The gear boss 27b axially supports a starter driven gear 27 via a bearing 28 in a rotatable manner, and a one-way clutch 29 is interposed between the gear boss 27b and the starter driven gear 27.

The right crankshaft body 20Ra is fitted with a primary drive gear 31 at a right end part.

The primary drive gear 31 meshes with a primary driven gear 42 that is axially supported by a main shaft 41 of the transmission and also meshes with a balancer driven gear 36 of a balancer 35 (refer to FIG. 1).

As shown in FIGS. 1 and 2, a starter motor 50 is disposed above the crankcase 11, behind the cylinder 12 that is protruded upward from the crankcase 11.

With reference to FIG. 2, the starter motor 50 is attached to an extended-side wall 11Rs in such a manner that a drive shaft 51 is inserted thereinto from the left side to the right side. The extended-side wall 11Rs is extended upward of the right crankcase 11R.

The extended-side wall 11Rs, into which the drive shaft 51 is inserted, is at approximately the same position in the right-left direction as the shaft-bearing wall 11Rw of the right crankcase 11R and is covered together with the shaft-bearing wall 11Rw from the right side by the right case cover 16 facing the extended-side wall 11Rs.

With reference to FIGS. 1 and 2, a reduction gear mechanism 60 is interposed between a starter drive gear 51a, which is formed to the drive shaft 51 of the starter motor 50, and the starter driven gear 27, which is axially supported by the crankshaft 20.

The reduction gear mechanism 60 is provided between the right crankcase 11R and the right case cover 16.

With reference to FIG. 2, in the reduction gear mechanism 60, an idle gear 61 meshes with the starter drive gear 51a, which is formed to the drive shaft 51 of the starter motor 50, and it is rotatably supported by a shaft collar 61c having a large outer diameter, via a collar 61b.

The shaft collar 61c is screwed to the extended-side wall 11Rs by a bolt 62.

The idle gear 61 meshes with a driven gear 71 of the torque limiter 70.

The torque limiter 70 coaxially includes the driven gear 71 for receiving power from the starter motor 50 and a transmission gear 72 for transmitting power.

The transmission gear 72 is integrated with a rotation shaft part 72a into one body, and the driven gear 71 is axially supported by the rotation shaft part 72a in a rotatable manner.

The rotation shaft part 72a is rotatably laid between the shaft-bearing wall 11Rw of the right crankcase 11R and the right case cover 16.

Details of the torque limiter 70 will be described later. A reduction gear shaft 80 is laid between the shaft-bearing wall 11Rw of the right crankcase 11R and the right case cover 16 and rotatably and axially supports a large-diameter gear 81a and a small-diameter gear 81b that are integrally formed into one body. The large-diameter gear 81a meshes with the transmission gear 72 having a smaller diameter than the large-diameter gear 81a, of the torque limiter 70, whereas the small-diameter gear 81b meshes with the starter driven gear 27 having a large diameter and being axially supported by the crankshaft 20.

Thus, in response to rotation of the starter drive gear 51a driven by the starter motor 50, the driven gear 71 of the torque limiter 70 is rotated via the idle gear 61. The rotation of the driven gear 71 is then transmitted to the transmission gear 72, and the large-diameter gear 81a meshing with the transmission gear 72 is rotated together with the small-diameter gear 81b. The starter driven gear 27 meshing with the small-diameter gear 81b is then rotated in a decelerated manner to rotate the crankshaft 20 via the one-way clutch 29, whereby the internal combustion engine 10 is started.

The torque limiter 70, which is interposed in the middle of the reduction gear mechanism 60 described above, will be detailed on the basis of FIGS. 3 to 5.

Figure 4:
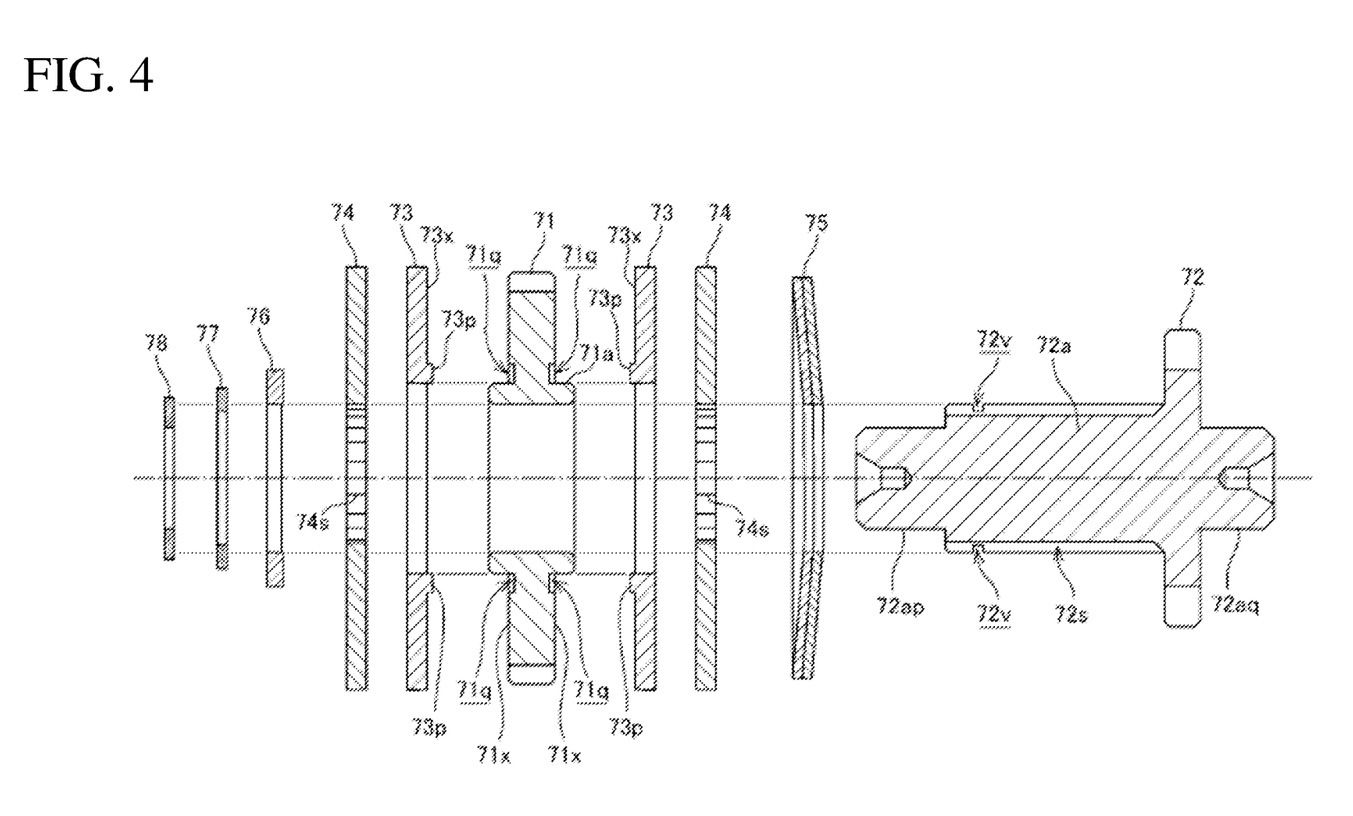
FIG. 4 is an exploded sectional view of the torque limiter.

With reference to FIG. 4, the transmission gear 72 is formed closer to one side in the axial direction of the rotation shaft part 72a that is integrated therewith.

With reference to FIG. 4, the rotation shaft part 72a has supported-shaft parts 72ap and 72aq at both end parts, and spline grooves 72s are formed on an outer circumferential surface at a part having a diameter slightly larger than those of the supported-shaft parts 72ap and 72aq, between the transmission gear 72 and the supported-shaft part 72ap on a side opposite to the transmission gear 72 in the axial direction.

The spline grooves 72s are formed with a cut-out 72v in the circumferential direction at a predetermined position closer to the supported-shaft part 72ap.

With reference to FIG. 4, a disc spring 75 is inserted and fitted to the part that is formed with these spline grooves 72s of the rotation shaft part 72a, from the supported-shaft part 72ap side, and it is abutted against the transmission gear 72. Then, a friction member 74 having a hollow disc shape is inserted and fitted, and it is abutted against the disc spring 75.

Figure 3:
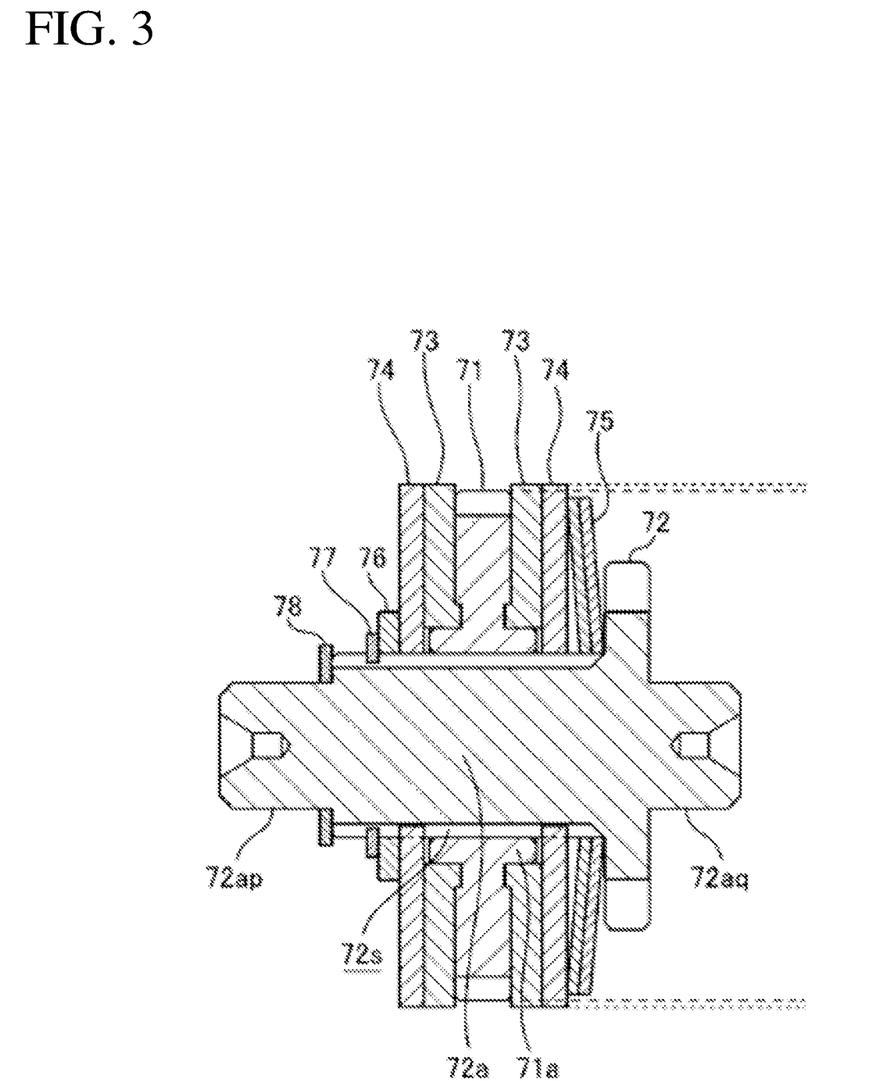
FIG. 3 is a sectional view of a torque limiter of the embodiment.

The friction member 74 has an outer diameter larger than that of the driven gear 71 (refer to the dashed lines in FIG. 3).

The friction member 74 is formed with spline protrusion lines 74s on an inner circumferential surface, and it is spline-fitted to the spline grooves 72s of the rotation shaft part 72a to be axially supported by the rotation shaft part 72a in a relatively non-rotatable but axially movable manner.

The driven gear 71 has a cylindrical boss 71a, which is extended to each side in the axial direction at an inner circumferential edge and thereby has a width increased in the axial direction.

Four circular recesses 71q are formed at equal intervals in the circumferential direction at each of parts along the cylindrical boss 71a of side surfaces 71x and 71x on outer circumferential sides of the cylindrical boss 71a of the driven gear 71.

Plate members 73 and 73 having a hollow disc shape are abutted against the driven gear 71 from both sides of the driven gear 71 in such a manner as to hold the driven gear 71 therebetween.

The plate member 73 has an outer diameter larger than that of the driven gear 71 but equal to that of the friction member 74 (refer to the dashed lines in FIG. 3).

The plate member 73 has an inner diameter approximately equal to the outer diameter of the cylindrical boss 71a of the driven gear 71.

The thickness of the plate member 73 is slightly greater than an axial direction width of a part axially extended from the side surface 71x of the driven gear 71 of the cylindrical boss 71a.

Figure 5:
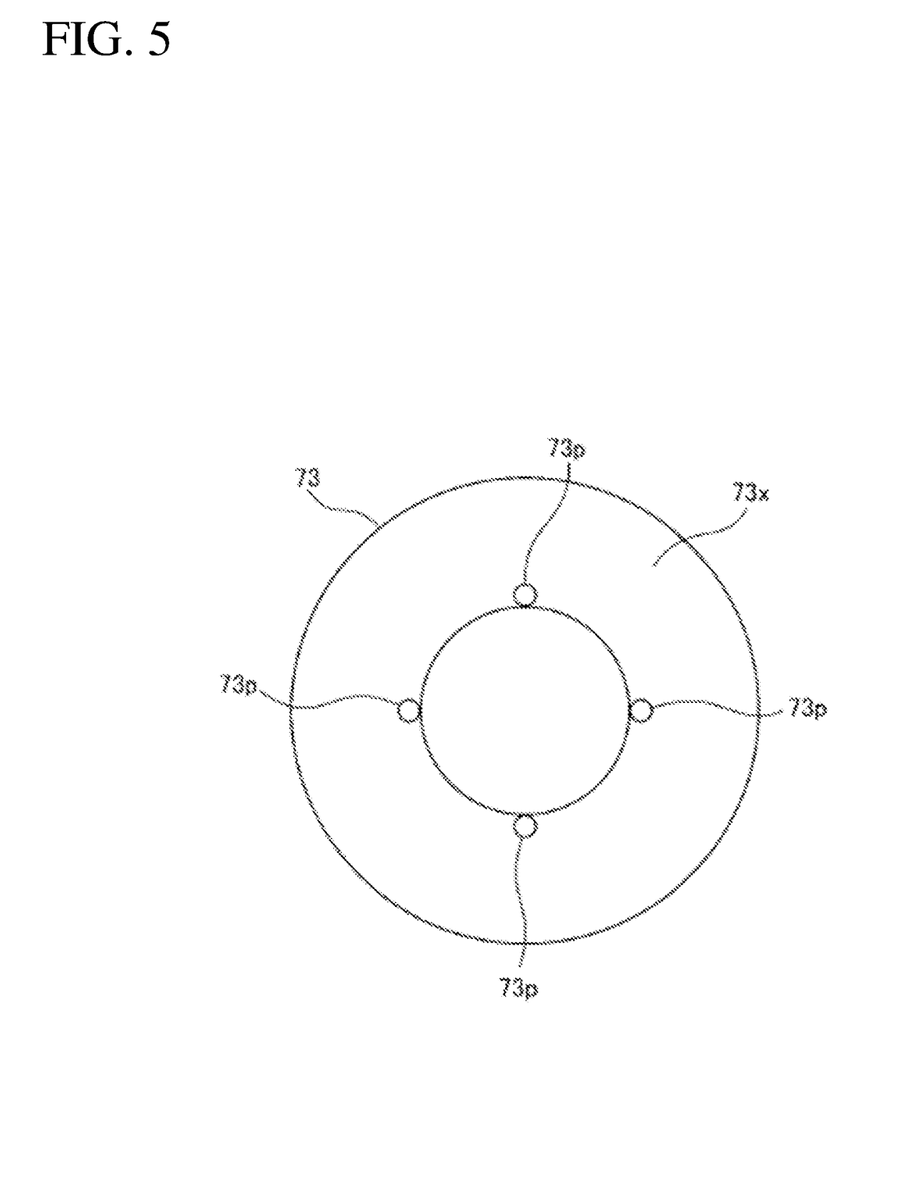
FIG. 5 is a side view of a plate member.

Four circular protrusions 73p are formed at equal intervals in the circumferential direction at a part along an inner circumferential surface of a side surface 73x facing the side surface 71x of the driven gear 71 of the plate member 73 (refer to FIG. 5).

The protrusion 73p of the plate member 73 has an outer diameter equal to an inner diameter of the recess 71q of the driven gear 71.

In the state in which the side surface 71x of the driven gear 71 faces the side surface 73x of the plate member 73, the four recesses 71q of the side surface 71x of the driven gear 71 face the four protrusions 73p of the side surface 73x of the plate member 73, respectively.

The side surfaces 73x and 73x of the plate members 73 and 73 are mated to both side surfaces 71x and 71x of the driven gear 71 from both sides in such a manner that the plate members 73 and 73 hold the driven gear 71 therebetween. Under these conditions, the four protrusions 73p of the plate member 73 are fitted to the four recesses 71q of each side of the driven gear 71, whereby the plate members 73 and 73 are engaged with the driven gear 71 in a relatively non-rotatable manner.

The disc spring 75 and the friction member 74 are sequentially inserted and fitted to the rotation shaft part 72a of the transmission gear 72, and then the driven gear 71 in the state of being engaged with the plate members 73 and 73 at both sides is also inserted and fitted thereto.

The driven gear 71 in the state of being engaged with the plate members 73 and 73 is axially supported in a rotatable manner by a part having the spline grooves 72s of the rotation shaft part 72a.

Figure 6:
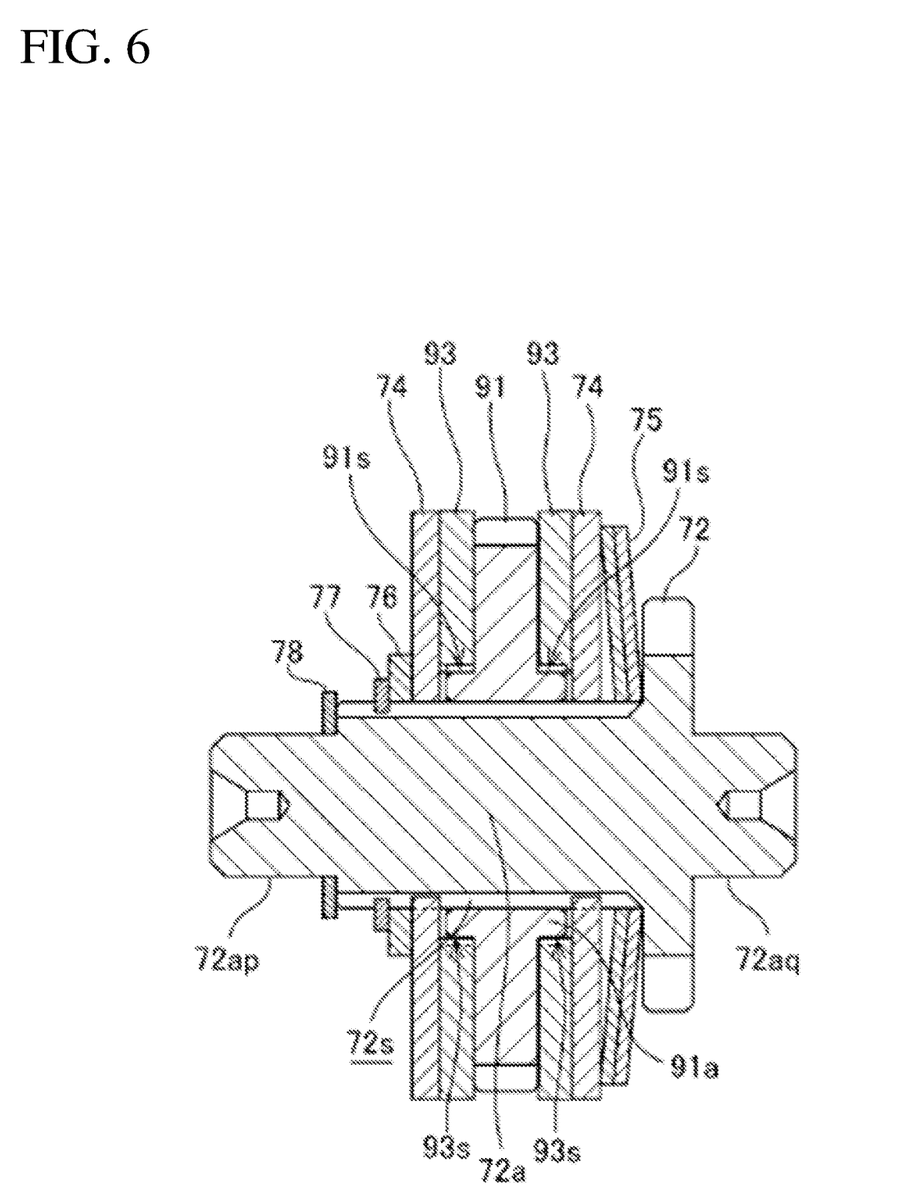
FIG. 6 is a sectional view of a torque limiter of another embodiment.

Thereafter, another friction member 74, which is the same as the friction member 74, is inserted and splined-fitted to the rotation shaft part 72a, and a washer 76 is also inserted and fitted thereto. In the state in which the washer 76 is pressed toward the transmission gear 72 against a biasing force of the disc spring 75, a retaining ring 77 is locked to the cut-out 72v, which is formed in the spline grooves 72s of the rotation shaft part 72a, to limit movement of the washer 76. Thus, as shown in FIG. 6, the plate members 73 and 73 and the friction members 74 and 74 on both sides of the driven gear 71 are assembled in the state of being pressed and held between the transmission gear 72 and the washer 76 by a spring force of the disc spring 75.

As a result, the friction members 74 and 74 are in pressure contact with the plate members 73 and 73, which are engaged with the driven gear 71, by the spring force of the disc spring 75, whereby torque is transmitted by friction between the friction member 74 and the plate member 73.

The rotation shaft part 72a of the transmission gear 72 in the state of being mounted with the driven gear 71, etc., is rotatably laid, while the supported-shaft parts 72ap and 72aq at both end parts are axially supported by the shaft-bearing wall 11Rw of the right crankcase 11R and the right case cover 16, respectively.

In addition, a washer 78 is inserted and fitted to the supported-shaft part 72ap on one side of the rotation shaft part 72a and is interposed between an end surface of the spline grooves 72s and the shaft-bearing wall 11Rw.

Rotation of the drive gear 51a of the starter motor 50 is transmitted to the driven gear 71 of the torque limiter 70 via the idle gear 61, and the driven gear 71 is thereby rotated. Then, the plate member 73, which is engaged with the driven gear 71, is rotated together, whereby torque is transmitted to the friction member 74 that is in pressure contact with the plate member 73 by the spring force of the disc spring 75.

The friction member 74, which is spline-fitted to the rotation shaft part 72a, rotates together therewith, resulting in rotation of the transmission gear 72 that is integrated with the rotation shaft part 72a into one body.

The plate member 73 and the friction member 74, which engage with the driven gear 71, each have an outer diameter larger than that of the driven gear 71 and are in pressure contact with each other. This structure provides a large friction area and makes it possible to set a larger torque capacity.

The plate member 73, which is held between the friction member 74 and the driven gear 71, enables the friction member 74 to be in pressure contact with the plate member 73 without being affected by the shape and the dimensions of the driven gear 71. Thus, a large friction area is easily obtained, whereby it is easy to set a larger torque capacity.

The plate member 73 engages with the driven gear 71 in a relatively non-rotatable manner and thereby rotates together with the driven gear 71 without sliding. This structure enables power that is received by the driven gear 71, to be transmitted to the plate member 73 without sliding, whereby a large torque capacity is easily set.

This torque limiter 70 reduces transmission of power upon receiving an excessive load greater than a set torque capacity, and it thereby prevents the starter motor 50 from being applied with an excessive load and protects the starter motor 50.

This torque limiter 70 has a simple and compact structure such that the driven gear 71 is axially supported in a rotatable manner by the rotation shaft part 72a that is integrated with the transmission gear 72 into one body, while the friction members 74 and 74 are in pressure contact with the plate members 73 and 73, which are engaged with the driven gear 71 from both sides, by the spring force of the disc spring 75.

The reduction gear mechanism 60 is a power transmission mechanism that transmits power from the starter motor 50 to the crankshaft 20 in an internal combustion engine mounted on a motorcycle, and it is disposed in a limited narrow space. Under these conditions, the torque limiter 70 having a compact structure is easily incorporated into such a reduction gear mechanism 60.

In incorporating the torque limiter 70 into the reduction gear mechanism 60, the friction member 74 and the plate member 73 having outer diameters larger than that of the driven gear 71 inhibit parallel movement in the axial direction of the torque limiter 70 or the idle gear 61 at the time of meshing the driven gear 71 of the torque limiter 70 and the idle gear 61 with each other.

In consideration of this, in this embodiment, the reduction gear mechanism 60 is assembled by the steps described below with reference to FIG. 3. First, the large-diameter gear 81a and the small-diameter gear 81b, which are integrally formed into one body, are axially supported in a rotatable manner by the reduction gear shaft 80, and the large-diameter gear 81a and the transmission gear 72 of the torque limiter 70 are meshed with each other. In this state, the reduction gear shaft 80 and the torque limiter 70 are simultaneously mounted to the shaft-bearing wall 11Rw.

At this time, the small-diameter gear 81b is meshed with the starter driven gear 27.

Next, only the idle gear 61 is inclined relative to the axial direction and is meshed with the driven gear 71 having a small outer diameter, beyond the friction member 74 and the plate member 73 having large outer diameters on the right side of the torque limiter 70. The idle gear 61 is then returned to an attitude perpendicular to the axial direction while being meshed with the starter drive gear 51a of the starter motor 50.

Thereafter, the shaft collar 61c is inserted into a hollow part of the idle gear 61 via the collar 61b and is screwed to the extended-side wall 11Rs by the bolt 62, whereby the idle gear 61 is rotatably supported by the shaft collar 61c.

Assembling the reduction gear mechanism 60 in this manner enables easily incorporating the torque limiter 70 into the reduction gear mechanism 60.

Next, a torque limiter of another embodiment is illustrated in FIG. 6.

This embodiment corresponds to a modification example of the engagement structure of the driven gear 71 and the plate member 73 and is the same as the above-described embodiment except for the driven gear and the plate member. The same members are illustrated by using the same reference signs.

Although having approximately the same shape as the driven gear 71, a driven gear 91 of this embodiment does not have the recesses 71q but is formed with serrations 91s on an outer circumferential surface of a cylindrical boss 91a.

On the other hand, although having approximately the same shape as the plate member 73, a plate member 93 does not have the protrusions 73p but is formed with serrations 93s on an inner circumferential surface.

The plate member 93, which coaxially faces the driven gear 91, is moved in the axial direction, and the serrations 93s on the inner circumferential surface of the plate member 93 are fitted to the serrations 91s on the outer circumferential surface of the cylindrical boss 91a of the driven gear 91 so that a side surface of the plate member 93 will be mated to a side surface of the driven gear 91. Thus, the plate member 93 is engaged with the driven gear 91 in a relatively non-rotatable manner.

The plate members 93 and 93 are engaged with both side surfaces of the driven gear 91 from both sides.

The plate member 93 and the friction member 74, which engage with the driven gear 91, each have an outer diameter larger than that of the driven gear 91 and are in pressure contact with each other. This structure provides a large friction area and makes it possible to set a larger torque capacity.

Although the torque limiters according to the embodiments of the present invention are described above, embodiments of the present invention are not limited to the foregoing embodiments and also include those implemented in various forms within the gist of the present invention.

REFERENCE SIGNS LIST

10 • • • internal combustion engine, 11 • • • crankcase, 11L • • • left crankcase, 11Lw • • • shaft-bearing wall, 11R • • • right crankcase, 11Rw • • • shaft-bearing wall, 11Rs • • • extended-side wall, 12 • • • cylinder, 13 • • • cylinder head, 14 • • • cylinder head cover, 15 • • • left case cover, 16 • • • right case cover, 20 • • • crankshaft, 20La • • • left crankshaft body, 20Ra • • • right crankshaft body, 27 • • • starter driven gear, 28 • • • bearing, 29 • • • one-way clutch, 30 • • • AC generator, 31 • • • primary drive gear, 35 • • • balancer, 36 • • • balancer driven gear, 41 • • • main shaft, 42 • • • primary driven gear, 50 • • • starter motor, 51 • • • drive shaft, 51a • • • starter drive gear, 60 • • • reduction gear mechanism (power transmission mechanism), 61 • • • idle gear, 61c • • • shaft collar, 62 • • • bolt, 70 • • • torque limiter, 71 • • • driven gear, 71a • • • cylindrical boss, 71q—recess, 72 • • • transmission gear, 72a • • • rotation shaft part, 72s • • • spline groove, 73 • • • plate member, 73p • • • protrusion, 74 • • • friction member, 75 • • • disc spring, 76 • • • washer, 77 • • • retaining ring, 78 • • • washer, 80 • • • reduction gear shaft, 81a • • • large-diameter gear, 81b • • • small-diameter gear, 91 • • • driven gear, 91a • • • cylindrical boss, 91s • • • serration, 93 • • • plate member, and 93s • • • serration.

What is claimed is:

1. A torque limiter that is incorporated into a power transmission mechanism for transmitting power from a starter motor to a crankshaft of an internal combustion engine,
    the torque limiter comprising a driven gear for receiving power from the starter motor and a transmission gear for transmitting power,
    the driven gear being disposed coaxially with the transmission gear and being rotatable with respect to the transmission gear,
    the driven gear and the transmission gear being configured to transmit power therebetween via a friction member,
    the friction member having a circular disc shape with an outer diameter that is larger than an outer diameter of the driven gear,
    wherein the friction member and the driven gear hold a plate member therebetween.

2. The torque limiter according to claim 1, wherein the transmission gear is integrated with a rotation shaft part into one body,
    the driven gear is axially supported by the rotation shaft part in a rotatable manner,
    the friction member is axially movably fitted to the rotation shaft part and non-rotatable with respect to the rotation shaft part, and
    the friction member is biased in an axial direction toward the driven gear by a biasing member.

3. The torque limiter according to claim 1, wherein the plate member has a circular disc shape with an outer diameter that is larger than the outer diameter of the driven gear.

4. The torque limiter according to claim 1, wherein the plate member is engaged with the driven gear, and
    wherein the plate member is non-rotatable with respect to the driven gear.

5. The torque limiter according to claim 2, wherein the friction member and the driven gear hold a plate member therebetween.

6. The torque limiter according to claim 3, wherein the plate member is engaged with the driven gear, and
    wherein the plate member is non-rotatable with respect to the driven gear.

* * * * *